United States Patent [19]

Weidner et al.

[11] Patent Number: 5,006,142
[45] Date of Patent: Apr. 9, 1991

[54] OXYNITRIDE GLASS PRODUCTION PROCEDURE

[75] Inventors: Jerry R. Weidner; Stanley T. Schuetz; Michael H. O'Brien, all of Idaho Falls, Id.

[73] Assignee: The United States of America as represented by the United States Department of Energy, Washington, D.C.

[21] Appl. No.: 500,352

[22] Filed: Mar. 28, 1990

[51] Int. Cl.$^5$ .......................... C03C 3/11; C03B 8/04
[52] U.S. Cl. ...................................... 65/32.5; 65/134; 501/32
[58] Field of Search ................... 501/32; 65/32.1, 32.5, 65/134

[56] References Cited

U.S. PATENT DOCUMENTS

| | | | |
|---|---|---|---|
| 3,582,307 | 6/1971 | Mulfinger et al. | 65/134 |
| 4,070,198 | 1/1978 | Chyung et al. | 65/33 X |
| 4,478,626 | 10/1984 | Morituki et al. | 65/32.5 X |

OTHER PUBLICATIONS

Loehman, "Oxynitride Glasses", Journal of Non-Crystalline Solids, 42 (1980), pp. 433–466.
Mittl et al., "Hip Glassmaking for High Nitrogen Compositions in the Y–Si–Al–O–N System", Journal of Non-Crystalline Solids, 71 (1985), pp. 287–294.
Brow et al., "Nitrogen Coordination in Oxynitride Glasses", Communications of the American Ceramic Society, Department of Materials Science and Engineering, The Pennsylvania State University, Apr. 1984, pp. C–72–C–74.
Baik et al., "Suppression of Frothing by Silicon Addition During Oxynitride Glass Synthesis", Commun. of the American Ceramic Society, Materials Science and Engineering, Cornell University, Jul. 1985, pp. C–168–C–170.
Abranovici et al., "Nitrogen-Containing Glasses and Glass Ceramics in Some Me–Si–Al–O–N Systems", Ind. Eng. Chem. Prod. Res. Dev. 1985, 24, 586–592.
Imon et al., "Oxycarbonitride Glass Formation by Melt Soldification", Journal of Materials Science Letters, 5 (1986), pp. 397–398.
EGG–MS–8014, Informal Report, Weidner et al., "Oxynitride Glass Technology for Armor and Composite Applications", Final Report, Mar. 1988.

Primary Examiner—Robert L. Lindsay
Attorney, Agent, or Firm—Thomas G. Anderson; James W. Weinberger; William R. Moser

[57] ABSTRACT

The invention is a process for the preparation of high quality oxynitride glasses without resorting to high pressures. Nitrogen-containing compounds such as $Si_3N_4$ are first encapsulated in a low melting temperature glass. Particles of the encapsulated nitrogen-containing compound are mixed with other oxide glass-formers and melted in an atmosphere of flowing nitrogen and in the presence of buffering gas to form the oxynitride glass. Glasses containing up to 15 at % nitrogen have been prepared by this method.

12 Claims, No Drawings

OXYNITRIDE GLASS PRODUCTION PROCEDURE

CONTRACTUAL ORIGIN OF THE INVENTION

The U.S. government has rights in this invention pursuant to Contract No. DE-AC07-76ID01570 between the U.S. Department of Energy and EG&G Idaho, Inc.

This invention relates to an improved method for preparing oxynitride glasses. More specifically this invention relates to a new and improved method for preparing oxynitride glasses which do not need the high temperatures and high pressures required by prior art methods of preparing these glasses.

BACKGROUND OF THE INVENTION

Substituting nitrogen for oxygen in glass structures to form oxynitride glasses has been shown to improve a variety of mechanical and other properties of these glasses. For example, oxynitride glasses exhibit better chemical durability, higher glass transition temperature and lower coefficients of thermal expansion then oxide glasses. Furthermore, oxynitride glasses retain their electrical insulating qualities at temperatures at which ordinary glasses become conductive. Because these glasses are stable at high temperatures and are leach resistant, they may be useful for encapsulating nuclear waste for long-term storage. These glasses are also useful in other high temperature applications, for example the joining of structural ceramics such as silicon nitride.

Oxynitride glasses are more difficult to prepare than conventional glasses for several reasons. For example, temperatures up to 1750° C. to 1800° C. are required for melting and homogenization of the melt. A low oxygen partial pressure is required during melting and homogenization to avoid oxidizing the glass-forming components. The number of nitride compounds which can serve as sources of nitrogen for the glasses is severely limited. Most oxynitride glasses are prepared with $Si_3N_4$ as the nitrogen source, although AlN, $Mg_3N_2$, YN $Si_2ON_2$ or $Li_3N$ can also be used in some glasses.

As hereinbefore stated, most oxynitride glasses are quite refractory and require high temperatures, ranging from 1500° to 1800°C., for melting and homogenization. The upper temperature limit is determined by the thermal decomposition of $Si_3N_4$ or other nitrogen source used, while the lower temperature limit is set by the melting temperature of the particular glass-forming batch composition. In one method of preparing oxynitride glasses, $Na_2CO_3$ $CaCO_3$ and $SiO_2$ are melted together to form a base glass. This glass is ground and mixed with varying amount of $Si_3N_4$ ranging up to 4.55 mol %. The mixture is placed in a molybdenum crucible and melted in a furnace, under a flowing atmosphere of high-purity $N_2$ at 1600° C. for 1.5 to 2.5 hours. The amount of retained nitrogen in glasses prepared by this method is up to about 3.23 mol %. Glasses prepared by this or similar methods are predominately a grey mass with overtones of blue and black. The material is usually translucent in one millimeter or thicker sections. In the *Journal of Non-Crystalline Solids* 71 (1985) p.287-294 another method is described for preparing oxynitride glasses in which glass-forming batch compositions, containing $Si_3N_4$ as the nitrogen source, are first dry mixed and then cold isostatically pressed at 60,000 psi to reduce powder volume. The pre-compacted batch of material is placed into a boron nitride crucible and heated in a hot isostatic press (HIP) under high-purity nitrogen gas pressurized to 30,000 psi to a temperature of about 1900° C. The HIP is held at temperature and pressure for about 60 minutes. Glasses prepared by this method can contain up to about 15 at. % nitrogen.

While the HIP process for producing oxynitride glasses is effective and produces glasses of consistent quality, the primary disadvantage of HIP glass production is the expense due to the high pressures and high temperatures required. Any large volume commercial use of oxynitride glass will require production methods which are less expensive than methods currently available.

SUMMARY OF THE INVENTION

A process has been developed for producing oxynitride glass which eliminates many of the problems hereinbefore recited. It has been found that by encapsulating or coating a nitrogen-containing compound, such as $Si_3N_4$, with a low melting temperature glass, and heating the glass under a buffer gas to prevent the nitrogen-containing compound from decomposing, it is possible to produce oxynitride glasses containing up to 15. at % nitrogen under conditions of 1 atmosphere of nitrogen. By the method of the invention, particles of low-melting temperature glass (hereinafter referred to as LMT glass), are mixed with particles of a nitrogen-containing compound to form a first batch. The first batch is heated, under an atmosphere of flowing nitrogen, to a temperature sufficient to melt the glass, but below the decomposition temperature of the nitrogen-containing compound. This temperature is maintained for a period of time sufficient for the LMT glass to melt, forming a first melt of molten glass containing particles of nitrogen-containing compound. After cooling, the glass is rough ground to form particles of nitrogen-containing compound encapsulated with LMT glass. The encapsulated particles are then mixed with glass-forming oxides in an amount sufficient to bring the composition of the mixture into a glass-forming region, forming a second batch. The second batch is heated, under an atmosphere of flowing nitrogen and in the presence of a buffer gas, to a temperature sufficient to melt the LMT glass and dissolve the glass-forming oxides and nitrogen-containing compound in the molten glass to form a second melt. This temperature is maintained for a period of time sufficient for the LMT glass to melt and for the nitrogen-containing compound and the glass-forming oxides to dissolve in the molten glass and for the mixture to homogenize, whereupon cooling the molten homogeneous melt, an oxynitride glass is formed.

It is therefore one object of the invention to provide an improved method for preparing oxynitride glasses.

It is another object of the invention to provide an improved method for making oxynitride glasses which does not require the high temperatures and high nitrogen pressures of prior art methods.

Finally, it is the object of the invention to provide an improved process for making optically clear oxynitride glasses containing up to about 15 at. % nitrogen which does not require the high temperatures and high nitrogen pressures of prior art methods.

DETAILED DESCRIPTION OF THE INVENTION

These and other objects of the invention for preparing oxynitrides glass may be met by mixing about 44.334 wt % $SiO_2$, 21.333 wt % $Al_2O_3$ and 34.333 wt % $Y_2O_3$ to prepare a LMT glass-forming batch, heating the batch to about 1400 degrees C. to melt the batch, forming a LMT melt, cooling the melt to form LMT glass, grinding the glass to form particles from about 2 to 10 microns in size, mixing the LMT particles with up to about 25 wt % $Si_3N_4$, as discrete particles to form a first batch, the amount of $Si_3N_4$ in the batch being proportional to the amount of nitrogen desired in the final product, compacting the batch at about 25,000 psi to form a first compact, heating the compact in a crucible, under an atmosphere of flowing nitrogen, in the presence of $Si_3N_4$ to provide a buffer gas, to a temperature from about 1450° C., maintaining this temperature for a period of time sufficient to melt the LMT glass particles and form a first melt of molten glass containing particles of $Si_3N_4$ distributed throughout, cooling the melt to form a glass containing particles of $Si_3N_4$, grinding the glass to a particle size of about 20 to 100 microns to form a coarse powder of $Si_3N_4$ particles encapsulated in LMT glass, adding about 12.65 wt % $SiO_2$ and about 50.0 wt % $Y_2O_3$ as glass-forming oxides to prepare a second glass-forming batch, compacting the batch at about 25,000 psi to form a second compact, and heating the compact in a crucible, under an atmosphere of flowing nitrogen and in the presence of particles of $Si_3N_4$ and $SiO_2$ to provide a buffer gas, to a temperature of about 1550° C., maintaining this temperature for a period of time sufficient to melt the LMT glass and for the glass-forming oxides and the $Si_3N_4$ to dissolve in the molten glass to form a final melt and for the melt to homogenize, and cooling the melt to form a glass, thereby forming an oxynitride glass containing up to about 15 at. % nitrogen.

The method of the invention is capable of producing oxynitride glass containing up to about 15 at. % nitrogen. The glass is optically clear and bubble-free and suitable for preparing optical devices for which oxynitride glass is desirable.

The LMT glass may be any oxide glass composition which has a melting temperature sufficiently below the decomposition temperature of the nitrogen-containing compound to permit so that the nitrogen-containing compound to be incorporated into the first glass melt without decomposing. Thus for $Si_3N_4$, the LMT glass should have a melting temperature below about 1500 degrees C. and preferably below 1400 degrees C. These compositions may include not only yttrium, silicon and aluminum oxides, but other oxides that will produce a final glass composition having the desired physical properties. Suitable compositions include the eutectic composition: $SiO_2$, 44.334 wt %, $Al_2O_3$, 21.333 wt % and $Y_2O_3$, 34.333 wt % which melts at about 1375 degrees C. and the peritectic composition: $SiO_2$, 33 wt %, $Al_2O_3$, 25 wt % and $Y_2O_3$, 42 wt % which melts at about 1385° C. Other suitable compositions might include Mg or other oxides.

The low-melting temperature glass is ground to a powder to facilitate its incorporation into the mixture with the nitrogen-containing compound. While the size is not critical, particles from about 2 to 10 microns were found to compact satisfactorily.

The nitrogen containing-compound may be any compound containing nitrogen that is compatible with the glass to be formed, such as $Si_3N_4$, AlN or YN, although other nitrogen-containing compounds may also be suitable. Up to about 50 wt % of nitrogen-containing compound can be mixed with the low-melting temperature glass to form the first batch. It is important that there be sufficient glass in the melt to coat or encapsulate the particles of nitrogen-containing compound. Particle size of the compound is not critical and need only be of such size as to facilitate its incorporation into the mixture. Sizes from about 2 to 10 microns, were found satisfactorily.

It is preferred that the mixtures of LMT glass and nitrogen-containing compound and the encapsulated nitrogen containing compound and glass-forming oxides be compacted to eliminate or reduce the availability of oxygen to react with the nitrogen during the glass-melting phase. Compaction of the mixture in a cold isostatic press at from 20,000 to 25,000 psi was found satisfactory.

Preferably, the first compact is heated in a crucible to a temperature sufficient to melt the low-melting temperature glass, but below the temperature at which the nitrogen-containing compound will decompose which, for $Si_3N_4$, is about 1550 degrees C. Preferably, the temperature of the melt is maintained at about 1450° C., which is just above the liquidus of the eutectic glass, to disperse the particles of $Si_2N_4$ throughout the melt while maintaining its stability. The temperature is maintained for a time sufficient to disperse the particles through the melt.

The flowing nitrogen atmosphere inhibits oxidation of the nitrogen-containing compound during melting by reducing the amount of oxygen which may be present in the atmosphere. The flow rate of the nitrogen is not critical and need be just sufficient to provide a slightly positive pressure of nitrogen in the furnace to prevent any in-flow of oxidizing gases from the environment surrounding the furnace.

The buffer gas provides an atmosphere similar to the atmosphere the materials in the compact would form were they to volatilize. The purpose of the buffer gas is to limit the oxygen available to react with the nitrogen-containing compound and to suppress SiO loss from the compact. By preventing decomposition of the nitrogen-containing compound in the compact, the compound is available to dissolve in the molten LMT glass rather than decompose. For example, $Si_3N_4$ reacts and decomposes according to the reaction:

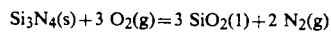

$$Si_3N_4(s) + 3\ O_2(g) = 3\ SiO_2(l) + 2\ N_2(g)$$

At these temperatures SiO is a significant problem. Thus the buffer gas consists of nitrogen, oxygen and SiO. This may be provided directly as a gas or more simply, the crucible containing the compact is surrounded with particulate $Si_3N_4$ or preferably a mixture of about a 1:1 ratio of $Si_3N_4$ and $SiO_2$ to which is preferably added about 20 wt % BN as a release agent to prevent the mixture from sticking to the crucible. This powdered mixture is packed around the crucible before heating in the furnace so that as the crucible is heated, the mixture is volatilized to provide the buffer gas over the melt. The amount of the material surrounding he crucible gas source as the buffer gas source must be sufficient to maintain the composition of the buffer gas during the heating step.

It is preferred, but not critical that the buffer gas be supplied during preparation of the encapsulated nitrogen-containing compound. It is critical that the buffer gas provided by $Si_3N_4$ and preferable the mixture of $Si_3N_4$ and $SiO_2$ be provided during the second melt to prevent decomposition and loss of melt components due to the higher temperature.

However, if the cation component of the nitrogen-containing compound is not volatile, for example AlN or YN, an atmosphere of flowing nitrogen alone would be sufficient to act as a buffering gas and prevent decomposition of the compound.

The LMT glass containing the particles of nitrogen-containing compound is rough ground to form particles of nitrogen-containing compound encapsulated in glass. The preferred particle size is about 10 times the size of the original nitrogen-containing compound particles. For example, if the original particle size of the $Si_3N_4$ was from about 2 to 10 μm, the rough ground particle size may vary from about 20 to 100 μm. Preferably, the particle size is less than 100 μm for ease of incorporation into the final glass-forming batch and most preferably from 20 to 40 μm.

The encapsulated particles are mixed with appropriate quantities of glass-forming compounds, for example $SiO_2$, $Al_2O_3$ and $Y_2O_3$ to prepare a second glass-forming batch of the desired final composition. The exact amount of each component will depend upon the composition of the encapsulated particles. For example, one ideal glass has the composition: Y—7 to 21, preferably 12 to 16 at. %; Si—9 to 23, preferably 14 to 18 at. %; Al—up to 15, preferable 3 to 10 at. %; $O_2$—35 to 63, preferably 40 to 53 at. % and $N_2$—up to 18, preferable 7 to 15 at. %. The second batch is compacted at 20,000 to 25,000 psi to form a second compact and heated in a crucible under an atmosphere of flowing nitrogen and in the presence of a buffer gas as the first compact.

The crucible in which the glass is prepared may be of any material that in inert to the molten glass. Suitable container materials include boron and graphite lined with boron nitride.

The temperature must be sufficient to melt the LMT glass and glass-forming compounds and to dissolve the nitrogen-containing compound. Depending upon the glass composition and the nitrogen containing compound, this may be from about 1550° to 1600° C. or higher. This temperature is maintained for a period of time sufficient to dissolve the nitrogen-containing compounds in the molten glass and to homogenize the mixture. Generally, a period of one to two hours has been found sufficient depending upon the size of the batch.

The following examples are given to illustrate the invention and are not to be taken as limiting the scope of the invention which is defined by the appended claims.

EXAMPLES

Eutectic and Peritectic Glass Preparation

Eutectic and peritectic glasses in the $SiO_2$-$Al_2O_3$-$Y_2O_3$ system were prepared in 50 g batches from the reagents listed in Table 1 below by weighing the appropriate amount and mixing by hand under acetone using an alumina mortar and pestle. The starting material powders were packed by hand into boron nitride lined graphite crucibles. The boron nitride has been previously applied to the graphite crucible interior as a thick methanol-BN slurry and allowed to dry. The BN coating was a release agent and prevented reaction between the melt and the crucible. The crucible is tightly bonded to the glass if a release agent is not used.

TABLE 1

| Eutectic composition $SiO_2$—$Al_2O_3$—$Y_2O_3$ | |
|---|---|
| $SiO_2$ | = 44.334 wt % |
| $Al_2O_3$ | = 21.333 wt % |
| $Y_2O_3$ | = 34.333 wt % |
| Peritectic Composition $SiO_2$—$Al_2O_3$—$Y_2O_3$ | |
| $SiO_2$ | = 33 wt % |
| $Al_2O_3$ | = 25 wt % |
| $Y_2O_3$ | = 42 wt % |

The melts were produced in a vertical "Astro" furnace with graphite furnace elements and flowing $N_2$ gas at 1600° C. with a 10 hour soak. Heating rate was about 30° C. per minute and the cooling rate was about 25° C. per minute.

The eutectic glass was white and cloudy, presumably due to inclusions of boron nitride release agent, whereas the peritectic glass was a very dark, grey-brown color.

Index of refraction of the eutectic glass is 1.628±0.001 and the peritectic glass refractive index is 1.672±0.004. The latter indices vary by about 0.005 and indicate that there are slight chemical inhomogeneities in the peritectic glass.

Armored $Si_3N_4$ Preparation

The 1(1) glass was prepared using the peritectic glass starting material and the 3(5) glass was prepared using the eutectic glass material. The amount of $Si_3N_4$ necessary for the nitride concentrations in the final melts was weighed together with each glass starting material. The proportions used are shown in Table 2 below.

TABLE 2

| Armored $Si_3N_4$ (AW-24) for 1(1) Replica Glass | | Armored $Si_3N_4$ (AW-25) for 3(5) Replica Glass | |
|---|---|---|---|
| Peritectic glass | = 83.800 wt % | Eutectic glass | = 75.168 wt % |
| $Si_3N_4$ | = 16.200 wt % | $Si_3N_4$ | = 24.832 wt % |

The glasses were ground <65 μm in an alumina shaker mill (Spex) before weighing. The weighed powders were mixed under acetone using an agate mortar and pestle (~5 min) and then ball milled in polyethylene bottles for 2.5 h using alumina ball mixing aids. The mixed powders were compressed in a cold isostatic press (CIP) at 25 ksi and then loaded into alumina crucibles lined with a boron nitride coating. The crucibles were loaded into a larger boron nitride crucible with lid. $Si_3N_4$ powder was packed tightly around the inner alumina crucibles to a depth of 2-3 mm. The $Si_3N_4$ buffered crucibles were heated at 1450° C. under flowing $N_2$ for 2 h. The average heating rate was 35° C. per minute. The cooling rate was about 25° C. per minute.

The peritectic glass armored $Si_3N_4$ (Sample AW-24) was a grey, vitreous, smooth, rounded slug filled with 4-6 mm bubbles. This sample flowed to the crucible walls. Inspection showed that the sample was a mixture of glass and crystals and the glass surrounded the crystalline phase. The crystalline phase was identified by x-ray diffraction as $\beta Si_3N_4$.

The eutectic glass armored $Si_3N_4$ (Sample AW-25) had a sintered appearance and did not flow. The sample is grey and had a very rough, pumiceous surface. The sample was similar to AW-24, i.e., it is a glass and crystal mixture, wherein the glass surrounds the crystalline phase. The crystalline phase was identified by x-ray diffraction as $Si_2ON_2$ (o'-sialon).

The $Si_3N_4$ gas composition buffer, packed around the inner crucibles containing the samples, changed color from brown to grey-white.

Synthesis of 1(1) and 3(5) Equivalent Glass

The glass armored $Si_3N_4$ materials were ground in an alumina Spex mill to a size $<65~\mu$. The powders were weighed together with the other reagents to give bulk cOmpositions identical to the 1(1) and 3(5) glasses. The compositions used are shown in Table 3 below.

TABLE 3

| W-28 1(1) Equivalent Glass (0.7 g) | |
|---|---|
| Peritectic armor glass | = 61.634 wt % |
| $SiO_2$ | = 10.046 wt % |
| $Y_2O_3$ | = 28.320 wt % |
| W-27 3(5) Equivalent Glass (22 g) | |
| Eutecic armor glass | = 37.294 wt % |
| $SiO_2$ | = 12.695 wt % |
| $Y_2O_3$ | = 50.011 wt % |

The 1(1) equivalent glass mixture (W-28) was homogenized by mixing under acetone with an agate mortar and pestle. The 3(5) equivalent glass mixture (W-27) was homogenized by milling the mixture using the Spex mill (7 min) and polyethylene bottles with alumina ball mixing aids.

The powder mixtures were CIPed at 25 ksi and packed in boron nitride crucibles with lids and lined with boron nitride powder release agent. The boron nitride crucibles were placed within a larger boron nitride crucible and the open space was filled with $Si_3N_4$ powder to serve as an atmosphere composition buffer.

The samples were heated at 1600° C. for 1 h in flowing $N_2$ atmosphere. The heating and cooling rates of the Astro furnace are the same as noted previously.

RESULTS

The powder mixture fused into two grey-black glass buttons. The glass did not adhere to the crucible wall.

The density and index of refraction of the glasses are compared with the original 1(1) and 3(5) glasses in Table 4 below. The density values are identical within the precision of the measurements. The index of refraction values of 3(5) and its equivalent are identical within the precision of measurement; however, the index of refraction of the 1(1) equivalent glass indicates that it is slightly inhomogeneous and is only very slightly ($\sim$0.007) lower than the original 1(1) glass. These data indicate that the glass produced at one atmosphere are in fact equivalent to the glass prepared using HIP techniques.

TABLE 4

| | | Bulk Density $(g/cc)^a$ | Index of Refraction[b] |
|---|---|---|---|
| 1(1)[c] | | 3.70 | 1.748 ± 0.002 |
| 1(1) | equivalent (W-28) | 3.72 | 1.741 average |
| | | | 1.743–1.738 range |
| 3(5)[d] | | 3.99 | 1.788 ± 0.002 |
| 3(5) | equivalent (W-27) | 4.01 | 1.788 ± 0.002 |

[a] Determined using the Archimedean method.
[b] Determined using the Beckie line method and Cargille index of refraction oils.
[c] $SiO_2$ = 27.51 wt %, $Al_2O_3$ = 12.91 wt %, $Y_2O_3$ = 50.02 wt %, $Si_3N_4$ = 9.57 wt %.
[d] $SiO_2$ = 25.51 wt %, $Al_2O_3$ = 5.98 wt %, $Y_2O_3$ = 59.03 wt %, $Si_3N_4$ = 8.88 wt %.

Additional nitrogen glasses were prepared using the glass compositions as described in TABLE 3 above, and using the same process conditions except that the crucibles were packed with a buffer gas forming mixture of a 1:1 ratio of $Si_3N_4$ and $SiO_2$ containing about 20 wt % BN as a release agent. A comparison of glasses produced by this method using the two component buffer gas with glasses produced under a single component buffer gas showed that there was a significant decrease in the loss of glass components, specifically nitrogen and silicon.

As has been shown by the preceding discussion and Examples, the process of the invention provides an effective new method for preparing high quality oxynitride glasses containing up to 15 at. % nitrogen.

The embodiment of the invention in which an exclusive property or privilege is claimed is defined as follows:

1. A method of preparing an oxynitrite glass comprising:
   mixing low-melting temperature glass with discrete particles of a nitrogen-containing compound to form a first batch,
   heating the first batch, under an atmosphere of flowing nitrogen to a temperature sufficient to melt the glass but below the decomposition temperature of the nitrogen-containing compound,
   maintaining the temperature for a period of time sufficient for the glass to melt, forming a first melt of molten glass containing particles of nitrogen-containing compound,
   cooling the melt to form a glass containing particles of nitrogen-containing compound,
   grinding the glass to form particles of nitrogen-containing compound encapsulated in low-melting temperature glass,
   mixing the particles with glass-forming oxides in an amount sufficient to bring the composition of the mixture into a glass-forming region, forming a second batch,
   heating the second batch, under an atmosphere of flowing nitrogen and in the presence of a buffer gas, to a temperature sufficient to melt the low-melting temperature glass and to dissolve the nitrogen-containing compound and glass-forming oxides in the molten glass to form a second melt,
   maintaining the temperature of the second melt for a period of time sufficient for the nitrogen-containing compound and the glass-forming oxides to dissolve in the molten glass to form a molten mixture and for the molten mixture to homogenize to form a homogeneous melt, and
   cooling the homogeneous melt, thereby forming an oxynitrite glass.

2. The method of claim 1 wherein the nitrogen-containing compound is selected from the group consisting of $Si_3N_4$, AlN and YN and the buffer gas is one or more members selected from the group of nitrogen, oxygen and silicon monoxide.

3. The method of claim 2 wherein the melting temperature of the low melting temperature glass is below about 1500° C.

4. The method of claim 3 wherein the particle size of the nitrogen-containing compound in the first batch is from about 2 to 10 microns, the low-melting temperature glass is present as discrete particles and the first batch is compressed to form a compact.

5. The method of claim 4 wherein the particle size of the nitrogen-containing compound encapsulated in low-melting temperature glass is from about 20 to 100 microns.

6. The method of claim 5 wherein the glass-forming oxides in the second batch are one or more members selected from the group consisting of $SiO_2$, $Al_2O_3$ and $Y_2O_3$ and the second batch is compressed to form a compact.

7. The method of claim 6 wherein the second batch is melted under a buffer gas of nitrogen, oxygen and silicon monoxide.

8. The method of claim 7 wherein the second compact is heated in a crucible and the buffer gas is provided by packing $Si_3N_4$ around the crucible before heating.

9. The method of claim 8 wherein the crucible containing the second compact is heated to a temperature of at least 1550° C.

10. The method of claim 9 wherein the low-melting temperature glass is a eutectic or peritectic composition prepared from $SiO_2$, $Al_2O_3$ and $Y_2O_3$.

11. The method of claim 10 wherein the glass containing the particles of nitrogen-containing compound is ground to a particle size from about 5 to 15 times the size of the nitrogen-containing compound particles.

12. A method of preparing a oxynitrate glass containing up to about 15 at. % nitrogen comprising:

preparing a low-melting temperature glass from $SiO_2$, $Al_2O_3$, and $Y_2O_3$ having a melting temperature below about 1400 degrees C., grinding the low-melting temperature glass to form a powder having a particle size of about 2 to 10 microns, mixing the powder with up to about 50 wt % $Si_3N_4$, as discrete particles to form a first batch, the amount of $Si_3N_4$ in the batch being proportional to the amount of nitrogen in the final product, compacting the first batch to form a first compact, heating the compact in a crucible, in an atmosphere of flowing nitrogen and in the presence of $Si_3N_4$ to from a buffer gas, to about 1450 degrees C. to melt the low-melting temperature glass to form a melt of low-melting temperature glass containing particles of $Si_3N_4$ therein, cooling the melt to form a low-melting temperature glass containing particles of $Si_3N_4$ embedded therein, grinding the glass to a particle size of about 20 to 100 microns to form particles of $Si_3N_4$ encapsulated in low-melting temperature glass, adding sufficient $Y_2O_3$, $SiO_2$, and $Al_2O_3$ to the particles to form a mixture having a composition in the glass-forming region, compacting the mixture to 20,000 to 25,000 psi to form a second compact, heating the second compact in a crucible under a flowing nitrogen atmosphere and in the presence of a mixture of a 1:1 ratio of $Si_3N_4$ and $SiO_2$ to from a buffer gas, to a temperature of about 1550 to 1600 degrees C. to melt the low-melting temperature glass and dissolve the $Si_3N_4$, $Y_2O_3$, $SiO_2$, and $Al_2O_3$ in the molten glass, maintaining this temperature for a period of time sufficient for the glass to melt and for the $Si_3N_4$, $Y_2O_3$, $SiO_2$, and $Al_2O_3$ to dissolve in the molten glass forming a melt and for the melt to homogenize, and cooling the melt, thereby forming an oxynitrite glass.

* * * * *